(12) United States Patent
Osborne (10) Patent No.: US 9,341,303 B1
(45) Date of Patent: *May 17, 2016

(54) PIGGING POLE

(71) Applicant: Larry D. Osborne, Crowley, TX (US)

(72) Inventor: Larry D. Osborne, Crowley, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/660,426

(22) Filed: Mar. 17, 2015

Related U.S. Application Data (63) Continuation-in-part of application No. 13/667,568, filed on Nov. 2, 2012, now Pat. No. 9,010,826.

(51) Int. Cl.
*B65G 7/12* (2006.01)
*F16L 55/46* (2006.01)
*B25G 3/02* (2006.01)
*B25G 1/04* (2006.01)

(52) U.S. Cl.
CPC . *F16L 55/46* (2013.01); *B25G 1/04* (2013.01); *B25G 3/02* (2013.01)

(58) Field of Classification Search
CPC ...... A63B 47/02; A63B 57/0037; B65G 7/12; A01K 97/14; B25J 1/04; F16L 55/46; B25G 3/02; B25G 1/04
USPC .................. 294/26, 175, 19.2, 209, 210, 211
See application file for complete search history.

(56) References Cited

U.S. PATENT DOCUMENTS

| | | | | |
|---|---|---|---|---|
| 3,004,362 | A * | 10/1961 | Day | 43/6 |
| 3,311,398 | A * | 3/1967 | Erhardt | 294/175 |
| 5,487,576 | A * | 1/1996 | DuVivier | 294/210 |
| 5,507,051 | A * | 4/1996 | Mazon | 7/116 |
| 6,263,572 | B1 * | 7/2001 | Hattan | 29/896.7 |
| 6,357,067 | B1 * | 3/2002 | Jones | 7/116 |
| 7,219,382 | B2 * | 5/2007 | Johnson | 7/116 |
| 8,210,584 | B2 * | 7/2012 | Hiltz | 294/24 |
| 8,308,209 | B1 * | 11/2012 | Bibow et al. | 294/61 |

OTHER PUBLICATIONS

Non-final Rejection dated Feb. 24, 2014 from related U.S. Appl. No. 13/667,568.
Amendment dated May 27, 2014 from related U.S. Appl. No. 13/667,568.
Final Rejection dated Jul. 23, 2014 from related U.S. Appl. No. 13/667,568.
Amendment After Final dated Sep. 23, 2014 from related U.S. Appl. No. 13/667,568.
Advisory Action dated Sep. 26, 2014 from related U.S. Appl. No. 13/667,568.
Request for Continued Examination dated Nov. 21, 2014 from related U.S. Appl. No. 13/667,568.
Notice of Allowance dated Dec. 18, 2014 from related U.S. Appl. No. 13/667,568.

* cited by examiner

*Primary Examiner* — Stephen Vu
(74) *Attorney, Agent, or Firm* — James E. Walton (57) ABSTRACT

A multi-sectional portable pigging pole to retrieve a pig from a pipe. The pole having a first shaft member and a second shaft member configured to interlock so as to form a shaft that extends reach into the pipe to retrieve the pig from therein.

7 Claims, 8 Drawing Sheets

PIGGING POLE

BACKGROUND

1. Field of the Invention

The present application relates generally to poles, and more particularly to pigging poles for pipelines.

2. Description of Related Art

Figure 1:
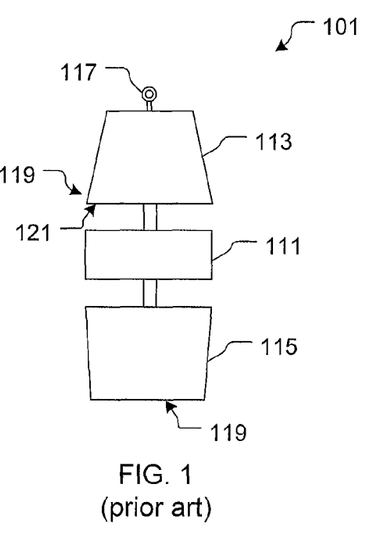
FIG. 1 is a simplified front view of a conventional pig.
Figure 2:
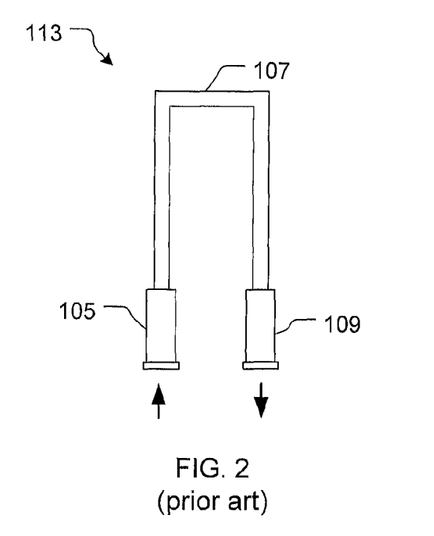
FIG. 2 is a simplified scaled down top view of a conventional pipeline.

The term "pigging" as it relates to the pipe industry refers to the process of using inspection gauges and/or cleaning devices, commonly known as pigs, to perform various maintenance operations within a pipe. Referring to FIGS. 1 and 2, a conventional pig 101 and an operably associated pipeline 103 are shown. The pigging process includes inserting pig 101 through a pig launcher 105, commonly known as a launching station, which thereinafter travels through pipe 107 to a pig catcher 109, commonly known also as a receiving station. In some embodiments, a backpressure created within the pipe 107 drives pig 101 between the two stations. Thereafter, pig 101 is manually retrieved from catcher 109 with a pigging pole.

Pig 101 typically includes a cleaning section 111 for cleaning the inner surfaces of pipe 107 and is preferably disposed between and rigidly attached to a front section 113 and a rear section 115. Front section 113 includes a loop 117 or other suitable means for removing pig 101 from catcher 109. The rear section 115 includes a relatively flat surface 119 for pushing thereagainst during the process of inserting pig 101 into pipe 107.

In alternative embodiments, pig 101 is devoid of a loop 117 or it is possible that loop 117 is damaged due to the high forces exerted thereagainst during the removal process. Pig 101 is further provided with a pliable lip 119 and an associated back surface 121. During use, pig 101 fits snugly within pipe 107 such that lip 119 comes into contact with the inner surface (not shown) of pipe 107.

Figure 3:
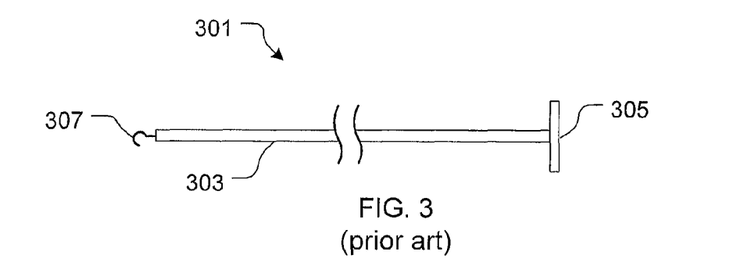
FIG. 3 is front view of a conventional pigging pole.

FIG. 3 depicts a conventional pigging pole 301 used to insert and retrieve pig 101. Pole 301 comprises of a shaft 303 that rigidly attaches to a ram 305. During use, a worker lifts and manipulates pole 301 to push pig 101 within pipe 107. Thereafter, a hook 307 rigidly attached to pole 301 is used to retrieve pig 101 via loop 117.

Pole 301 has been shown to be an effective means for inserting and retrieving pig 101; however, considerable shortcomings remain. For example, shaft 303 is a single pole having sufficient length for extending the reach within both launcher 105 and catcher 109 to insert and retrieve pig 101, respectively, which in turn does not facilitate easy transporting of pole 301 between multiple pipelines. Thus, presently a pigging pole is left at each pipeline for use.

Another disadvantage includes the arduous task of retrieving pig 101 from within catcher 109. It should be understood that catcher 109 is enclosed area that restricts entering light and viewing access of hook 307 relative to loop 115, resulting in excessive time and effort exhausted in retrieving pig 101. In most scenarios, the worker is forced to guess the positioning of hook 307 relative to loop 117.

In addition, it has been shown that excessive force is required to remove the tightly fitted pig 101 from within pipe 107, resulting in large forces exerted thereagainst, which in turn can damage loop 117. It is a long-felt need to retrieve pig 101 when pig 101 is devoid of or has a damaged loop 115.

Although the foregoing developments represent great strides in the area of pigging poles, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

While the pigging pole and method of use is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the system and method are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The pigging pole and method of use according to the present application overcomes common disadvantages associated with conventional pigging poles, as discussed above. Specifically, the pigging pole is lightweight and portable, thus facilitating easy transporting between worksites and means for storage. To achieve this feature, the pigging pole includes a multi-section shaft having a plurality of members joined together to form a desired length. The pigging pole also overcomes a long-felt need by providing an illumination system that facilitates means for retrieving the pig. Furthermore, the pigging pole includes a fastener that allows removal of the pig when the loop is damaged or missing. These and other features of the pigging pole and method of use are discussed in detailed below and shown in the accompanying drawings.

The pigging pole and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

Figure 4:
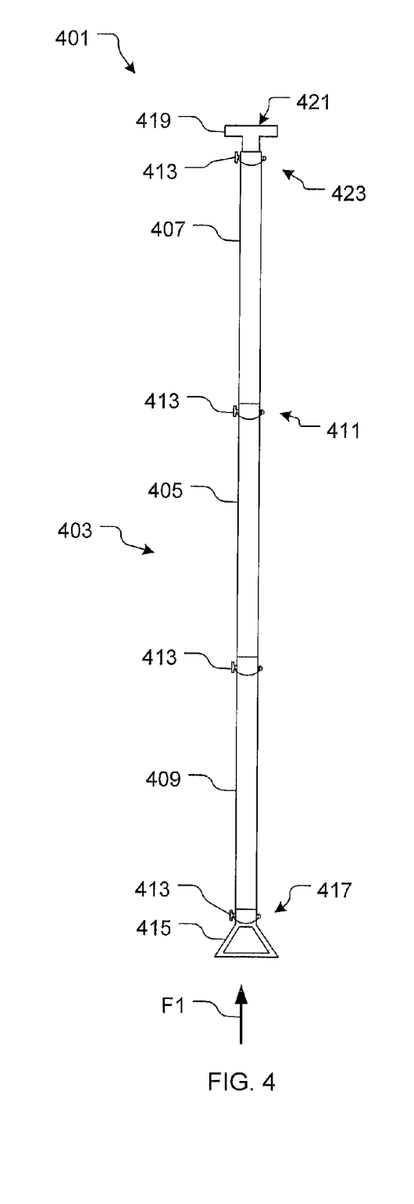
FIGS. 4 and 5 are front assembled views of a pigging pole according to a preferred embodiment of the present application.

Referring now to the drawings wherein like reference characters identify corresponding or similar elements throughout the several views, FIG. 4 depicts a pigging pole 401 (hereinafter pole 401) according to the preferred embodiment of the present application. Pole 401 includes a multi-section shaft 403 preferably having three members: a first shaft member 405 disposed between and removably attached to a second shaft member 407 and to a third shaft member 409. It should be appreciated that more or less shaft members could be utilized in alternative embodiments depending on the desired longitudinal shaft length L1. For example, a fourth shaft member could be added to shaft 403 to increase the overall reaching distance. Having a multi-section shaft overcomes the long-felt need to provide a lightweight, portable pigging pole for transit between different worksites. During use, the worker joins a desired number of shaft members together to form a desired length, then manipulates pigging pole for inserting and retrieving pig, thereafter disassembles members of the pigging pole, and subsequently stores the pigging pole in a location such as the bed of a pickup truck.

A plurality of locking mechanisms 411 are used to secure the shaft members to each other and for securing to one or more devices operably associated therewith, as discussed below. In the preferred embodiment, locking mechanism 411 is a pin 413 received through a hole 701 that extends through the thickness of the shaft member. Of course, it is also contemplated utilizing different locking mechanisms in alternative embodiments in lieu of the preferred pin-hole configuration. It should be understood that the pin-hole configuration is an effective means to rapidly interlock and retain the members together as forces F1 and F2 are applied thereagainst during the inserting and retrieving process of pig 101.

Pole 401 further comprises a handle 415 that removably attaches to shaft 403 at a first end 417. Handle 415 provides the user gripping access of pole 401 for applying forces relative to the longitudinal length L1 of shaft 403, as indicated with arrows F1 and F2, during the inserting and retrieval process, respectively. In the contemplated embodiment, handle 415 removably attaches to pole section 409 via locking mechanism 411.

Pole 401 also comprise a removably attachable ram 419 having a surface 421 configured to abut against rear surface 119 of pig 101. In the preferred embodiment, ram 419 attaches at a second end 421 of shaft 403 opposing first end 417. During use, a worker first positions pig 101 within launcher 105 and thereafter applies force F1 against pig 101 via ram 419. In the contemplated embodiment, ram 419 is also removably attached via locking mechanism 411.

Figure 5:
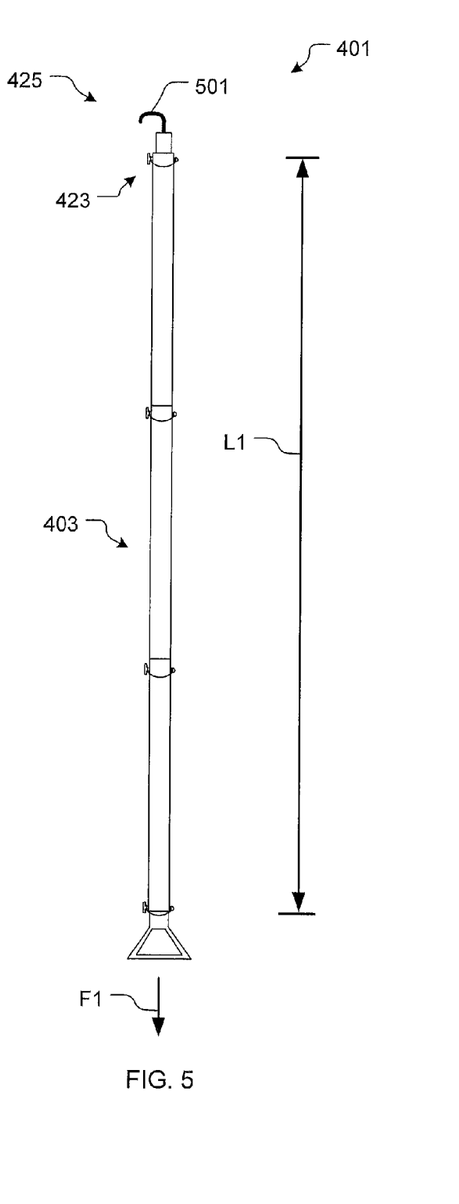

Pole 401 further includes a removably attachable fastener 425 configured to retrieve pig 101 from catcher 109. Fastener 425 is preferably a hook 501 adapted to fit around the lip 119 and to apply a force in the direction of force F2 against surface 121 of pig 101 during the retrieval process. This feature overcomes the long-felt need to provide means to retrieve pig 101 from catcher 109 when loop 117 is damaged or missing. For example, during use the worker slides hook 501 between the inner wall (not shown) of pipe 107 and lip 119 and thereafter rotates hook 501 such that a force in the direction of F2 is applied against surface 121. It will also be appreciated that hook 501 is adapted to secure directly to loop 117. Of course, it is also contemplated using different devices to remove pig 101 from within pipe 107 in alternative embodiments in lieu of the preferred hook 501.

Figure 6:
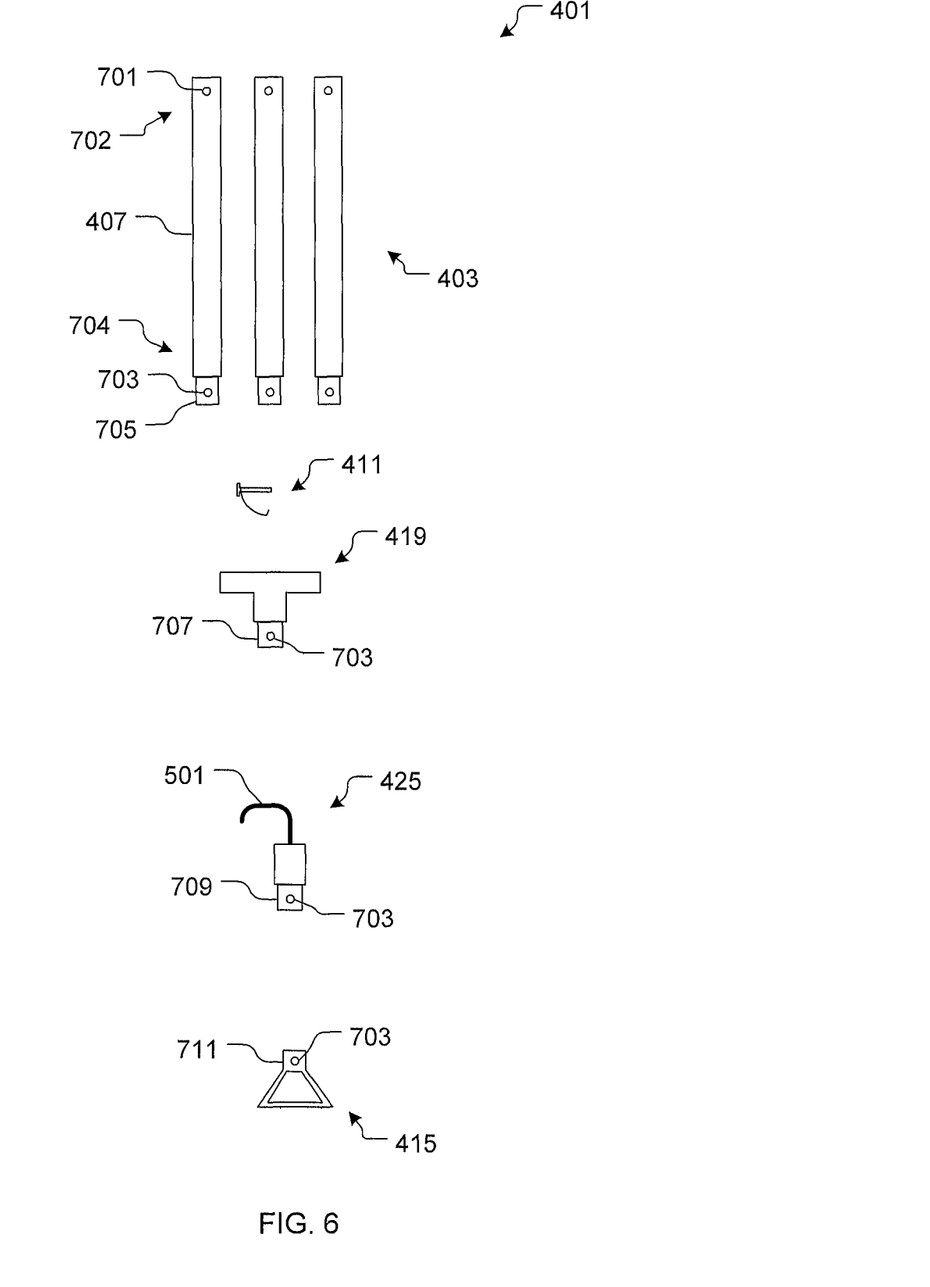
FIG. 6 is a front disassembled view of the pigging pole of FIGS. 4 and 5.

FIG. 6 shows a disassembled view of pole 401. Shaft members 405, 407, and 409 each have opposing ends for joining with each other or other operably associated devices. As depicted, shaft member 407 includes a first end 702 having a hole 701 for receiving locking mechanism 411 and a second opposing end 704 having a second hole 703 extending through a joint 705. For the sake of clarity, only one of the three shaft members is described in detail; however, each shaft member includes the same features.

During assembly, joint 705 fits within and interlocks via hole 703 and locking mechanism 411 to either a first end 702 of another shaft member or to either ram 419, handle 415 or fastener 425, as depicted in FIGS. 4 and 5. Although not shown in detail, first end 702 can be considered the female section of the member adapted to receive a male joint 705 or male joints 707, 709, and 711. Each male joint includes a hole 703 that extends through the thickness of the joints and configured to receive attachments means 411. It should also be appreciated that joints 707, 709, and 711 could also be configured in alternative embodiments as female joints adapted to receive joint 705 of member 407.

Figure 7:
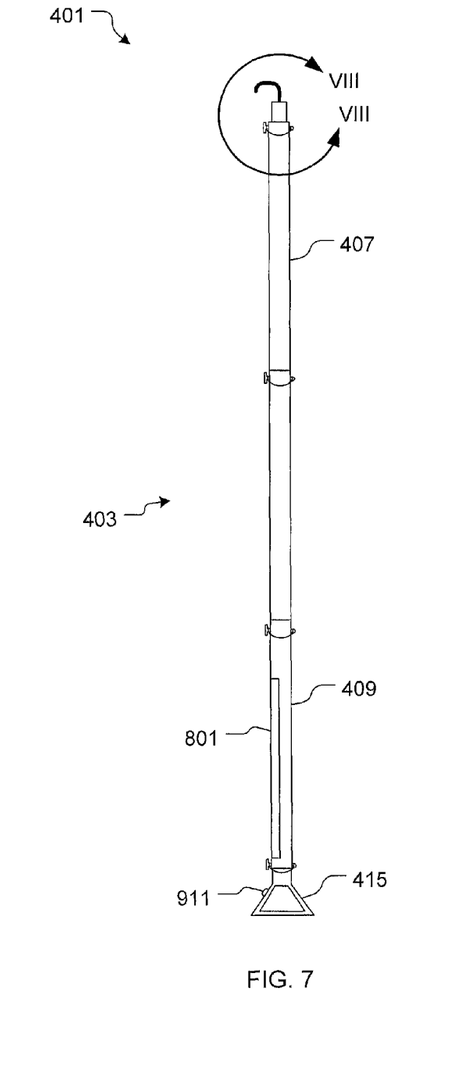
FIG. 7 is a front view of the pigging pole of FIG. 5.
Figure 8:
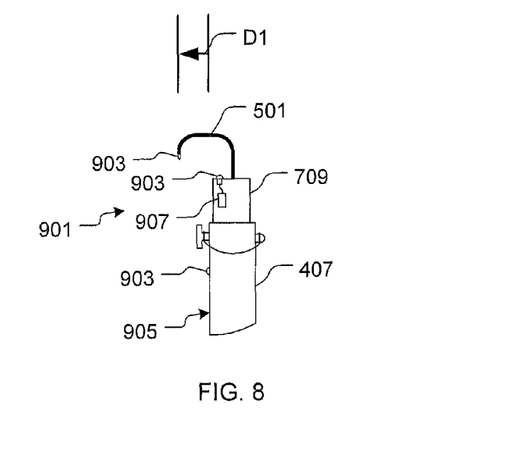
FIG. 8 is an enlarged view of a fastener of the pigging pole of FIG. 7 taken at VIII-VIII.
Figure 9:
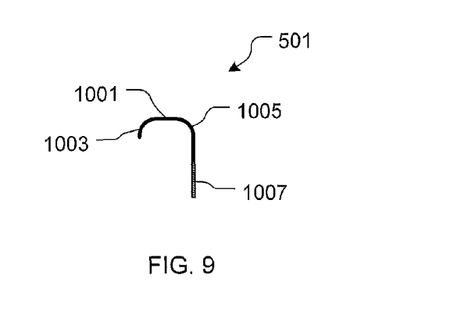
FIG. 9 is a front view of a hook of FIG. 8.

Referring next to FIGS. 7-9, pole 401 is further provided with means for viewing the angular orientation and positioning of hook 501 relative to loop 117. In particular, an indicator 801 is carried on member 407 to provide angular orientation of the hook relative to pip 101. In the preferred embodiment, indicator 801 is an etching on the outer surface of member 407; however, it will be appreciated that alternative embodiments could utilized different visual indicators such as illumination devices.

FIG. 8 is an enlarged view of section VIII-VIII of FIG. 7. Pole 401 is further provided with an illumination system 901 configured to illuminate fastener 425 relative to pig 101. Illumination system 901 preferably comprises one or more lights 903 selectively located on either hook 501, joint 709, and/or shaft 905 of shaft member 407. These lights are conductively coupled to a power supply 907, which is preferably a battery, which in turn is preferably activated via a switch 911 carried by handle 415 and/or other member of pole 414, for example, joint 709.

In FIG. 9, detailed features of hook 501 are shown. In particular, hook 501 includes three sections: a first elongated section 1001 having a linear, non-radial curvature; a second section 1003 that forms a curved lip; and a third section 1005 that joins section 1001 to a threaded shaft portion. Having an elongated section 1001 provides reaching access of hook 501 beyond lip 119 of pig 101, while second section 1003 provides grip with surface 121 during the removal process. As shown in FIG. 8, hook 501 preferably extends beyond surface 905 of member 407, as depicted with arrow D1. This feature facilitates sufficient length to reach surface 121 of pig 101.

In the preferred embodiment, hook 501 threadedly fastens to joint 709 via a plurality of left handed threads 1007. It is desired using left-handed threads so that the worker cannot merely replace hook 501 with any type of fasteners commonly used in the industry. For example, if hook 501 is damaged, there is a possibility for the worker to merely replace hook 501 with a commonly known hook which can create sparks when in contact with the inner surfaces of the pipe. Having left-handed threads prevents the worker from replacing hook 501 with these commonly known fasteners.

It will be appreciated that the components of pigging pole 401 are composed of a material that does not create sparks, such, as aluminum, so as to prevent sparking within pipe 107 during operation. Such features are desired since pigging poles are typically utilized on pipelines that channel flammable liquids and gases; a spark could cause serious injuries to the worker and damage to the pipeline.

Figure 10:
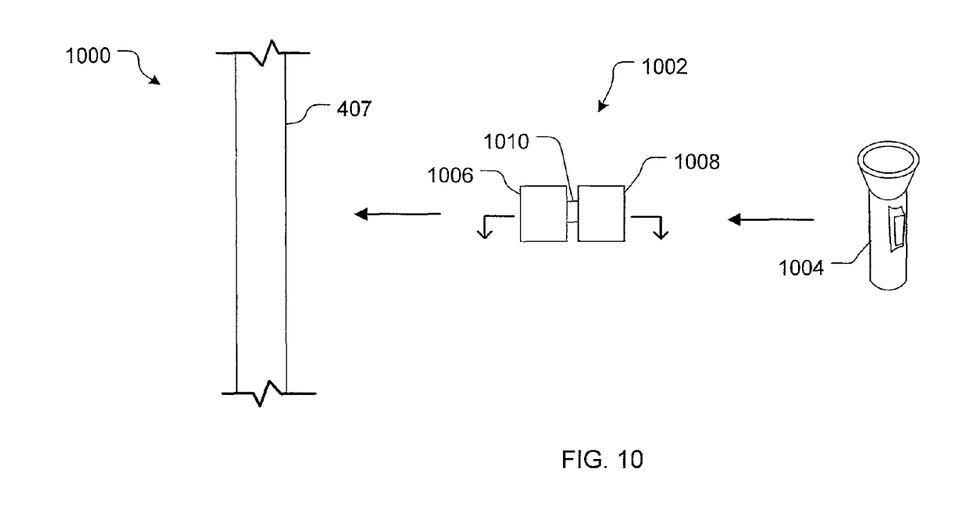
FIG. 10 is a side view of a pigging pole system in accordance with an alternative embodiment of the present application.
Figure 11:
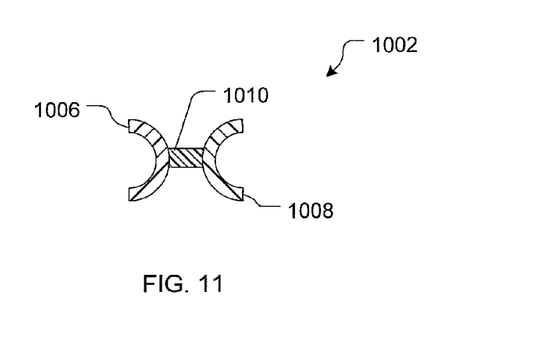
FIG. 11 is a cross-sectional view of a flashlight attachment of FIG. 10 taken at XII-XII.

Referring now to FIGS. 10 and 11 in the drawings, side and cross-sectional views of a pigging pole system 1000 are shown in accordance with an alternative embodiment of the present application. It will be appreciated that system 1000 hereby incorporates one or more of the features of the alternative embodiments discussed herein.

In the contemplated embodiment, system 1000 includes one or more of a flashlight adapter 1002 configured to secure a flashlight 1004 to the pole 407 at a selected location. Adapter 1002 is configured to releasably and slidingly engage with the outer surface of the pole 407. To achieve this feature, adapter 1002 includes a first clip 1006 having a cylindrical shape and configured to engage with the outer circumference of the pole 407 and a second clip 1008 configured to engage with the flashlight 1004.

System 1000 provides significant advantages, namely, the user is now able to view the pig within the conduit and manipulate the hook, accordingly for retrieval. It will be appreciated that adapter 1002 is composed of an elastic material; however, alternative embodiments could include other types of materials, e.g., magnetic metallic material that allows the adapter to removably engage with the metal pole 407. It should also be appreciated that flashlight 1004 is shown configured to illuminated a beam of light in a single direction; however, alternative embodiments could include a flashlight that illuminates a beam of light in a direction relative perpendicular to pole 407.

Figure 12:
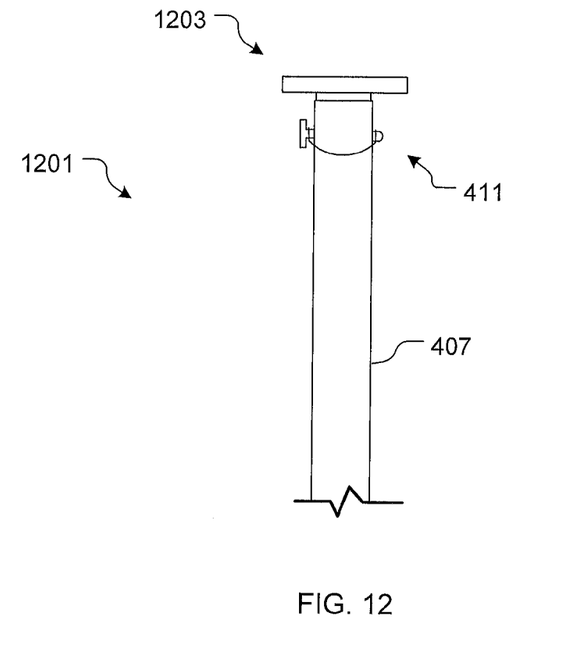
FIG. 12 is a side view of a pigging pole system in accordance with an alternative embodiment of the present application.
Figure 13:
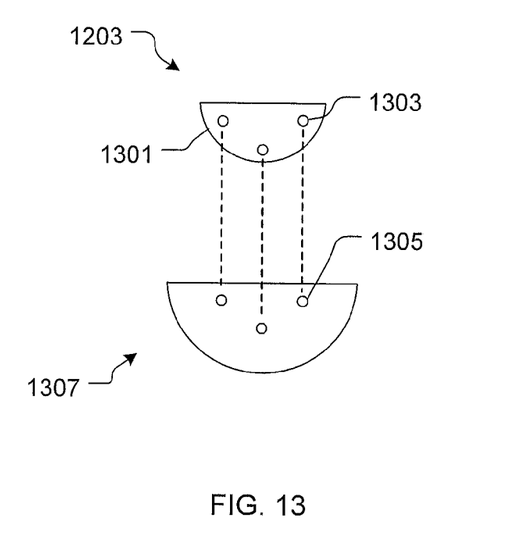
FIG. 13 is a front view of a hoe attachment of the system of FIG. 12.

Referring now to FIGS. 12 and 13 in the drawings, side and front views of a pigging pole system 1201 are shown in accordance with an alternative embodiment of the present application. It will be appreciated that system 1201 hereby incorporates one or more of the features of the alternative embodiments discussed herein.

In the contemplated embodiment, system 1201 includes one or more of a hoe 1203 removably attached to pole 407 via locking mechanism 411 and configured to remove debris from within the pig conduit. To achieve this feature, hoe 1203 include a body 1301 having a contoured surface to match the contouring of the inner diameter of the conduit.

It will be appreciate that hoe 1203 includes a plurality of fastening means 1303, e.g., a plurality of holes that engage with fastening means 1305 of a larger hoe 1307. This feature allows system 1201 to be adapted for use with hoes having multiple sizes hoes.

Figure 14:
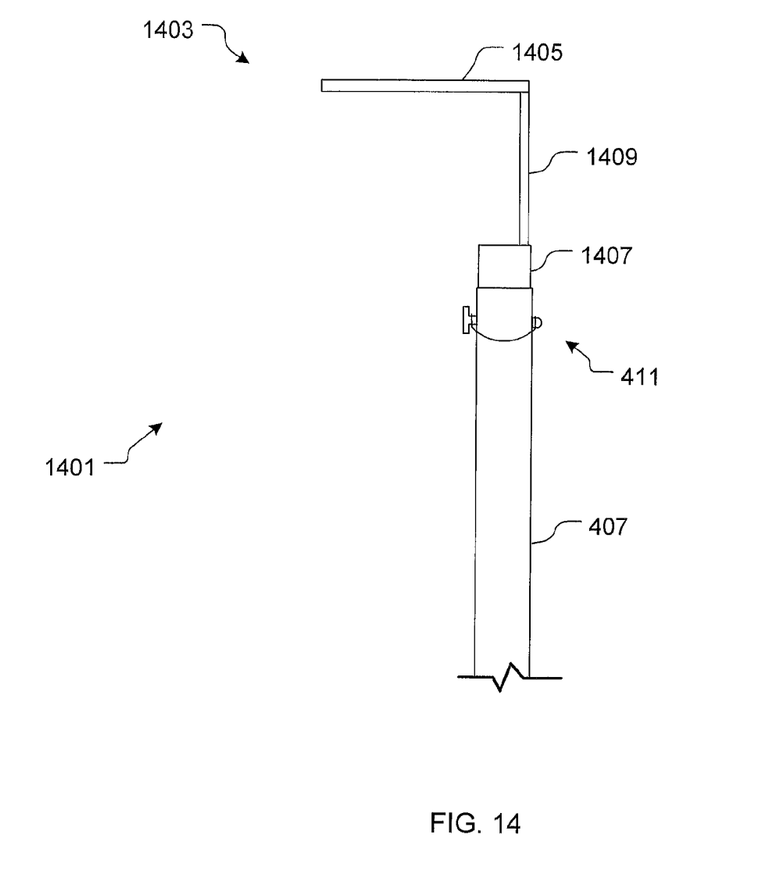
FIG. 14 is a side view of a pigging pole system in accordance with an alternative embodiment of the present application.
Figure 15:
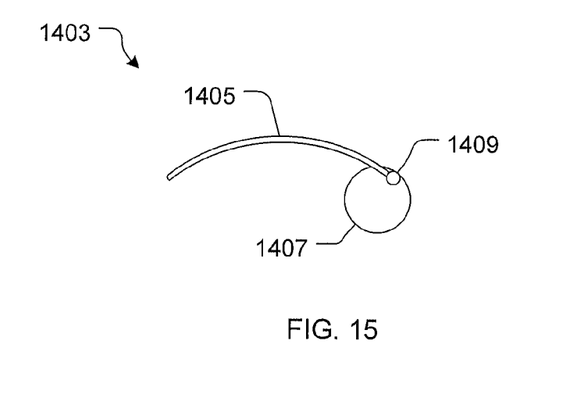
FIG. 15 is a side view of a hook attachment of the system of FIG. 14.

Referring now to FIGS. 14 and 15 in the drawings, side and front views of a pigging pole system 1401 are shown in accordance with an alternative embodiment of the present application. It will be appreciated that system 1401 hereby incorporates one or more of the features of the alternative embodiments discussed herein.

In the contemplated embodiment, system 1401 includes one or more of an elongated hook 1403 having a body 1405 contoured to match the inner diameter of the pig conduit. The body 1405 has a small thickness, thereby allowing the user to slide the body 1405 between the pig and pig conduit during the retrieval process. During use, the worker will retrieve the pig from the rear and pull the pig within the conduit.

The elongated hook 1405 is rigidly attached to a male joint 1407 via a shaft 1409. When assembled, the joint 1407 is secured to pole 407 via attachment means 411.

Figure 16:
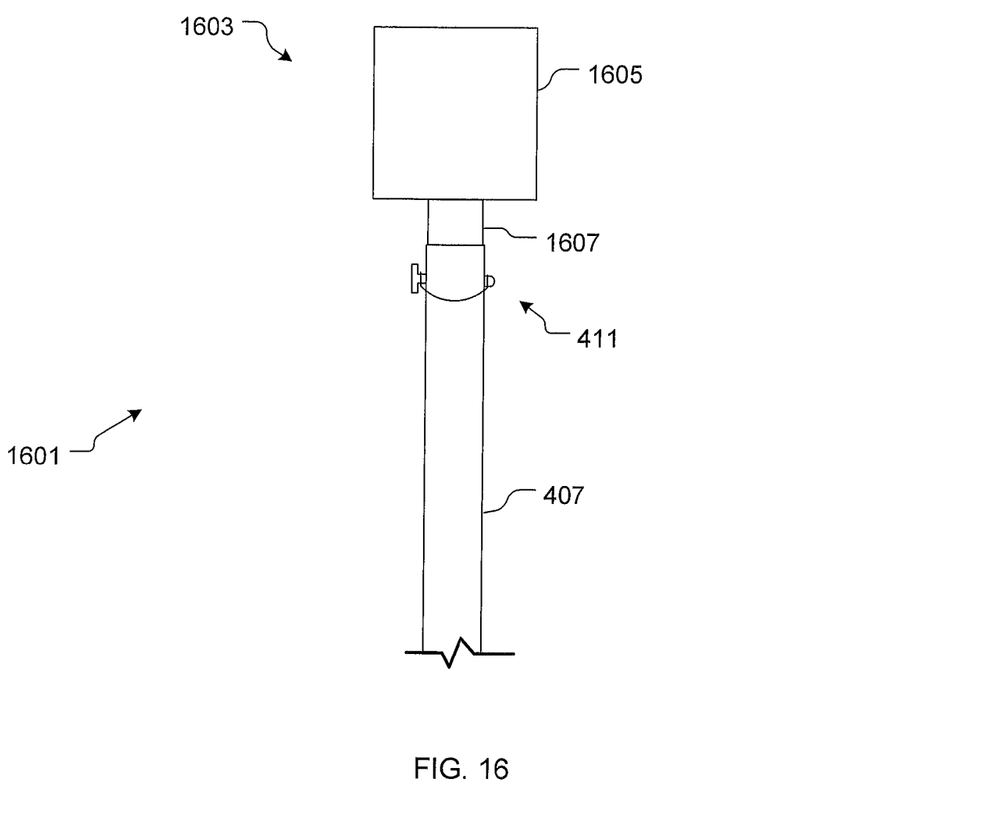
FIG. 16 is a side view of a pigging pole system in accordance with an alternative embodiment of the present application.
Figure 17:
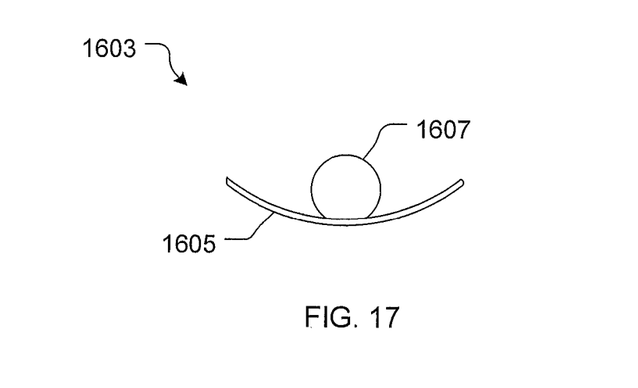
FIG. 17 is a side view of a shovel attachment of the system of FIG. 16.

Referring now to FIGS. 16 and 17 in the drawings, side and front views of a pigging pole system 1601 are shown in accordance with an alternative embodiment of the present application. It will be appreciated that system 1601 hereby incorporates one or more of the features of the alternative embodiments discussed herein.

In the contemplated embodiment, system 1601 includes one or more of a shovel 1603 having a contoured body 1605 rigidly attached to a male joint 1607 configured to secure to pole 407 via locking mechanism 1607. During use, the shovel is configured to remove debris disposed within the pig conduit.

Although particular step sequences are shown, described, and claimed, it should be understood that steps may be performed in any order, separated or combined unless otherwise indicated and will still benefit from the present disclosure.

It is apparent that a pigging pole and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A multi-sectional portable pigging pole for retrieving a pig from a pipe, the pole comprising:
   a first shaft member;
   a second shaft member configured to interlock with the first shaft member so as to form a shaft that extends reach into the pipe for retrieving the pig from therein;
   a removably attached flashlight adapter configured to removably secure a flashlight to the shaft; and
   a left-threaded hook attached to a joint configured to slidingly engage within the second shaft member and configured to lock into a fixed position to the second shaft with a locking mechanism and configured to fasten to the pig to remove the pig from within the pipe, the left-threaded hook, having:
   a first elongated section having a linear, non-radial curvature;
   a second section that forms a curved lip; and a third section that joins first elongated section to a threaded shaft portion, which in turn engages with the second shaft member.

2. The pole of claim 1, the flashlight adapter having:
a first clip configured to engage with the shaft; and
a second clip configured to engage with the flashlight.

3. The pole of claim 2, wherein the first clip is configured to removably and slidingly engage with the shaft.

4. The pole of claim 2, wherein the flashlight adapter is composed of an elastomeric material.

5. The pole of claim 1, wherein the locking mechanism is a pin.

6. The pole of claim 1, further comprising:
a ram removably coupled to an end of the second shaft member, the ram having a flat surface for contact with the pig during the process of pushing the pig into the pipe.

7. The pole of claim 1, further comprising:
a handle removably coupled to the first member, the handle being configured to provide a force relative to a longitudinal length of the shaft during removal of the pig from the pipe.

\* \* \* \* \*